(12) United States Patent
Fu

(10) Patent No.: US 10,310,310 B2
(45) Date of Patent: Jun. 4, 2019

(54) DISPLAY MODULE AND DISPLAY DEVICE

(71) Applicants: BOE TECHNOLOGY GROUP CO., LTD., Beijing (CN); BEIJING BOE MULTIMEDIA TECHNOLOGY CO., LTD., Beijing (CN)

(72) Inventor: Mancang Fu, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/914,023

(22) PCT Filed: Aug. 21, 2015

(86) PCT No.: PCT/CN2015/087797
§ 371 (c)(1),
(2) Date: Feb. 24, 2016

(87) PCT Pub. No.: WO2016/127621
PCT Pub. Date: Aug. 18, 2016

(65) Prior Publication Data
US 2016/0357054 A1    Dec. 8, 2016

(30) Foreign Application Priority Data
Feb. 9, 2015 (CN) .................. 2015 2 0092530 U

(51) Int. Cl.
*G02F 1/1333* (2006.01)
*G02F 1/13* (2006.01)
*H04N 5/64* (2006.01)

(52) U.S. Cl.
CPC .......... *G02F 1/133308* (2013.01); *G02F 1/13* (2013.01); *H04N 5/64* (2013.01);
(Continued)

(58) Field of Classification Search
CPC ........ G02F 1/133308; G02F 1/13; H04N 5/64
See application file for complete search history.

(56) References Cited

U.S. PATENT DOCUMENTS 6,974,242 B1 * 12/2005 Chu .................. G02F 1/133308
362/633
7,492,421 B1 * 2/2009 Kim .................. G02F 1/133308
349/58
(Continued)

FOREIGN PATENT DOCUMENTS

CN         201779519 U      3/2011
CN         202102195 U      1/2012
(Continued)

OTHER PUBLICATIONS

International Search Report and Written Opinion of the International Searching Authority for International Application No. PCT/CN2015/087797, filed Aug. 21, 2015, dated Nov. 24, 2015. Translation provided by Dragon Intellectual Property Law Firm.
(Continued)

*Primary Examiner* — Elmito Breval
(74) *Attorney, Agent, or Firm* — Harness, Dickey & Pierce, P.L.C.

(57) ABSTRACT

The present disclosure provides a display module and a display device. The display module includes a backlight module and a display screen arranged in front of the backlight module. The display module further includes a front frame that is shared with the display device. The backlight module and the display screen in the display module are directly fixed together by the front frame.

20 Claims, 3 Drawing Sheets

(52) U.S. Cl.
CPC .............. *G02F 2001/13332* (2013.01); *G02F 2001/133314* (2013.01); *G02F 2001/133328* (2013.01)

(56) References Cited

U.S. PATENT DOCUMENTS

| | | | | |
|---|---|---|---|---|
| 7,907,234 | B2* | 3/2011 | Fang | G02B 6/0085 349/58 |
| 8,059,227 | B2* | 11/2011 | Shin | G02F 1/133308 349/149 |
| 2002/0186526 | A1* | 12/2002 | Kim | G02F 1/133308 361/679.05 |
| 2003/0081996 | A1* | 5/2003 | Sun | G02F 1/133308 403/381 |
| 2006/0033858 | A1* | 2/2006 | Liao | G02F 1/133308 349/58 |
| 2006/0087804 | A1* | 4/2006 | Tsukamoto | G02F 1/133308 361/679.22 |
| 2007/0076139 | A1* | 4/2007 | Bae | G02B 6/0088 349/58 |
| 2007/0229726 | A1* | 10/2007 | Azuma | G02F 1/133308 349/58 |
| 2010/0033447 | A1* | 2/2010 | Horie | G06F 3/041 345/174 |
| 2010/0202105 | A1* | 8/2010 | Chang | G06F 1/1647 361/679.27 |
| 2011/0221995 | A1* | 9/2011 | Park | G02F 1/13336 349/58 |
| 2011/0260959 | A1* | 10/2011 | Son | G02F 1/133308 345/102 |
| 2012/0242926 | A1* | 9/2012 | Hsu | G02F 1/133308 349/58 |
| 2013/0141665 | A1* | 6/2013 | Huang | G02F 1/133308 349/60 |
| 2013/0278857 | A1* | 10/2013 | Zeng | G02B 6/0085 349/58 |
| 2014/0118659 | A1* | 5/2014 | Yu | G02F 1/133308 349/58 |
| 2014/0320778 | A1* | 10/2014 | Tang | G02F 1/133308 349/58 |

FOREIGN PATENT DOCUMENTS

| | | |
|---|---|---|
| CN | 202372890 U | 8/2012 |
| CN | 102662262 A | 9/2012 |
| CN | 102662263 A | 9/2012 |
| CN | 202583639 U | 12/2012 |
| CN | 202587196 U | 12/2012 |
| CN | 102929011 A | 2/2013 |
| CN | 202721750 U | 2/2013 |
| CN | 202995184 U | 6/2013 |
| CN | 203224694 U | 10/2013 |
| CN | 204362194 U | 5/2015 |
| JP | 2008107701 A | 5/2008 |
| JP | 2014074756 A | 4/2014 |
| KR | 20050068661 A | 7/2005 |

OTHER PUBLICATIONS

Extended European Search Report regarding Application No. 15832866.6 dated Oct. 23, 2018.

* cited by examiner

DISPLAY MODULE AND DISPLAY DEVICE

CROSS REFERENCE OF RELATED APPLICATION

The present application is the U.S. national phase of PCT Application No. PCT/CN2015/087797 filed on Aug. 21, 2015, which claims priority to Chinese patent application No. 201520092530.3 filed on Feb. 9, 2015, the disclosures of which are incorporated herein by reference in their entirety.

TECHNICAL FIELD

The present disclosure relates to a technical field of display technology, and more particular to a display module and a display device.

BACKGROUND

As illustrated in FIG. 1, a conventional liquid crystal display television (LCD-TV) includes: a front frame 11, a display screen module, a system board, a fixing connector, a back cover 6 of the display, etc. The display screen module generally includes a display screen 1, a backlight module 3 and a metal outer frame 10. The backlight module 3 includes a backlight source, an optical sheet and a back plane.

In the conventional LCD-TV, the front frame 11 is covered on the metal outer frame 10 by a common section bar, and thus there are two layers at an edge of a front screen, which leads to inelegant appearance and increased thickness of the TV, and is opposite to a trend of the TV of delicate appearance and decreased thickness in the market. As a result, such arrangement can hardly meet the market demand. Furthermore, it is high expense for making plastic mould or metal mould for manufacturing ultra-large sized LCD-TVs, which however have minimal presence in the market, so that a sharing of the mould making expense by each ultra-large sized LCD-TV is relatively large, and thus the cost for manufacturing the ultra-large sized LCD-TV is difficult to be decreased.

SUMMARY

One embodiment of the present disclosure provides a display module and a display device, which can reduce weight and thickness of the LCD-TV and reduce cost for developing and manufacturing the LCD-TV.

For achieving the above object, the present disclosure provides in some embodiments the following technical solutions.

A display module applied to a display device includes a backlight module and a display screen arranged in front of the backlight module. The display module further includes a front frame that is shared with the display device, and the backlight module and the display screen in the display module are directly fixed together by the front frame.

Further, the backlight module further includes a back cover that is shared with the display device; and the display screen and components in the backlight module are directly fixed by the front frame and the back cover.

Further, the front frame includes a top part, a bottom part and a side wall connecting the top part and the bottom part; the display module further includes at least one first member which is arranged between the backlight module and the bottom part of the front frame; the first member is configured to adjust a gap between the front frame and the display screen.

Further, the first member is arranged on a side of the backlight module that is away from the display screen.

Further, the first member is mounted on the side of the backlight module that is away from the display screen by screw fastening or clamping.

Further, the first member includes a curved mounting guide corner member formed at a side of the first member that is closer to the side wall.

Further, the first member is a plastic component or metal component.

Further, the front frame includes front frame bars and front frame connectors, and the front frame is formed by jointing the front frame bars with the front frame connectors.

Further, the front frame includes a first opposite bar group and a second opposite bar group; each of the first opposite bar group and the second opposite bar group includes front frame bars that are oppositely arranged; the first member is installed between the backlight module and the bottom part of one of the front frame bars in the first opposite bar group, and the first opposite frame group is installed in a back-side fastening mode.

Further, the front frame bars in the first opposite bar group are two short front frame bars of the front frame; and the front frame bars in the second opposite bar group are two long front frame bars; and the two long front frame bars are installed in a back-side fastening mode.

Further, each of the front frame bars has a U-shaped cross section.

Further, each of the front frame connectors includes a first mounting plate and a second mounting plate which is connected to the first mounting plate; the first mounting plate and the second mounting plate are connected to two of the front frame bars, respectively.

Further, the back cover is fastened to the front frame bars from a side of the back cover that is away from the display screen.

Further, the display screen is placed within a retaining wall region of the backlight module in a flatwise orientation.

The present application provides in some embodiments a display device including the display module according to any one of the above embodiments.

The present application provides in some embodiments a display device including: a front frame, including a top part, a bottom part and a side wall connecting the top part and the bottom part; and a backlight module, a display screen and at least one first member which are fixed between the bottom part and the top part. The display screen is installed in front of the backlight module and directly connected to the top part; and the first member is installed at a back side of the backlight module and located between the back side of the backlight module and the bottom part.

Further, the first member is mounted at the back side of the backlight module by screw fastening or clamping.

Further, the first member includes a curved mounting guide corner member formed at a side of the first member that is closer to the side wall.

Further, the side wall directly faces an entire lateral side of the backlight module.

Further, a portion of the bottom part that is in contact with the first member is mounted on the first member by a screw.

According to the display module and the display device of the present disclosure, the backlight module and the display screen of the display module are directly fixed together by the front frame of the display device without an additional metal outer frame, i.e., the front frame of the display device also functions as the module outer frame of the display module. As a result, the metal outer frame 10 functioning as the module outer frame as illustrated in FIG. 1 is omitted, and thus the weight and the thickness of the product may be reduced, and the production cost may be decreased.

BRIEF DESCRIPTION OF THE DRAWINGS

In order to illustrate technical solutions of embodiments of the present disclosure in a clearer manner, the drawings desired for the embodiments will be described briefly hereinafter. Obviously, the following drawings merely relate to some embodiments of the present disclosure, and based on these drawings, a person skilled in the art may obtain other drawings without any creative effort.

REFERENCE SIGNS

1: display screen; 11: front frame; 10: metal outer frame; 3: backlight module; 4: front frame connector;

5: first member; 6: back cover; 2: front frame bar; 7: front frame bar; 8: front frame bar; 9: front frame bar.

DETAILED DESCRIPTION

In the following, the technical solutions according to the embodiments of the present disclosure are clearly and completely described. It is obvious that the described embodiments are merely some of all the embodiment of the present disclosure instead of all the embodiments.

Figure 1:
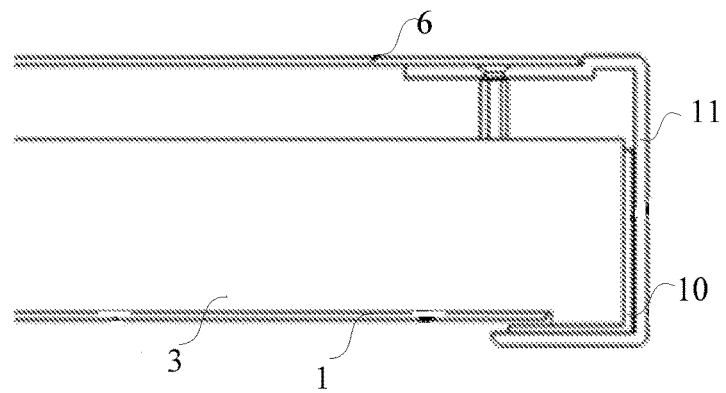
FIG. 1 is a sectional view of an LCD-TV in the related art.

In some embodiments, the present disclosure provides a display module applied to a display device. The display module includes a backlight module and a display screen in front of the backlight module. The display module further includes a front frame that is shared with the display device. The backlight module and the display screen in the display module are directly fixed together by the front frame. Herein, the sentence that "the backlight module and the display screen in the display module are directly fixed together by the front frame" means that the backlight module and the display screen are directly fixed together by the front frame without an additional metal outer frame (for example, the metal outer frame 10 as illustrated in FIG. 1).

In this embodiment, no metal outer frame is arranged in the display module, and the front frame of the display device also functions as a module outer frame of the display module, i.e. the backlight module and the display screen of the display module are directly fixed together by the front frame of the display device. As a result, the metal outer frame 10 functioning as the module outer frame as illustrated in FIG. 1 is omitted, and thus the weight and the thickness of the product may be reduced. The production cost may also be decreased because the expense for making the mould of the metal outer frame 10 is saved.

Furthermore, the backlight module of the display module further includes a back cover that is shared with the display device. The display screen and various components in the backlight module are directly fixed by the front frame and the back cover. In this embodiment, the back cover of the backlight module is further omitted, and the display screen and components in the backlight module are directly fixed by the front frame and the back cover of the display device. A person skilled in the art may understand that, in the implementation, shapes and materials of the front frame and the back cover may be improved according to an actual situation, so that the front frame and the back cover not only function as the module outer frame to fix the display screen and the components in the backlight module, but also meet the market demand of delicate appearance of the display device.

In the following, specific embodiments will be explained to further illustrate the display module and the display device in more details.

Figure 2:
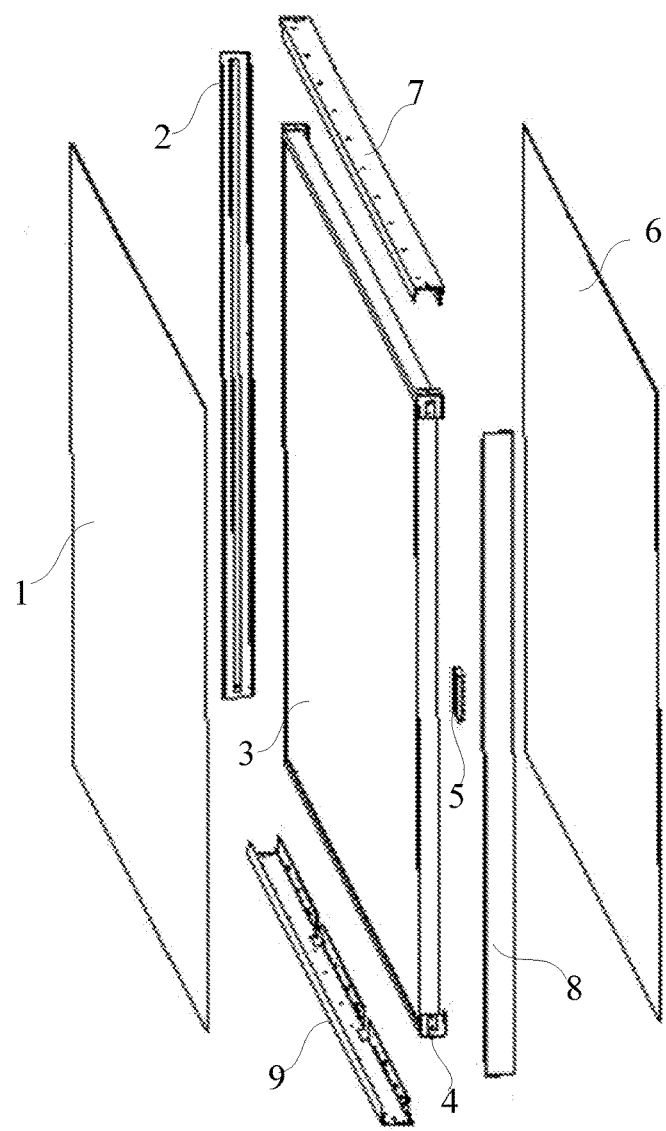
FIG. 2 is an exploded view of an LCD according to one embodiment of the present disclosure.
Figure 3:
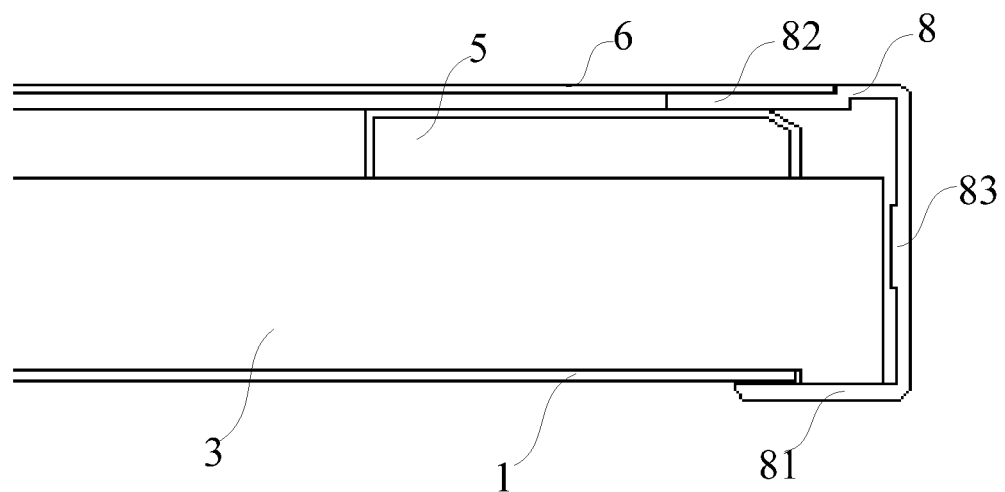
FIG. 3 is a sectional view of the LCD as illustrated in FIG. 2.
Figure 4:
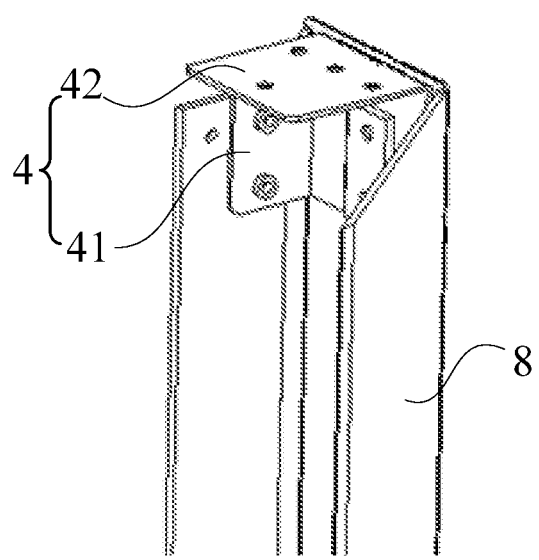
FIG. 4 is a schematic view showing a front frame connector mounted on a top side of a front frame bar according to one embodiment of the present disclosure.

As illustrated in FIGS. 2, 3 and 4, a large-sized LCD according to one embodiment includes a display screen 1, a backlight module 3, four front frame bars 2, 7, 8, 9, and front frame connectors 4. The front frame connector 4 includes a first mounting plate 41 and a second mounting plate 42 which is connected to the first mounting plate 41. The front frame bars 2, 7, 8, 9 are connected to form the front frame by the front frame connectors 4. As illustrated in the sectional view of FIG. 3, the front frame includes a top part 81, a bottom part 82, a side wall 83 connecting the top part 81 and the bottom part 82, a first member 5, and a back cover 6. The top part 81, the bottom part 82 and the side wall 83 form a half-surrounding structure for packaging the display screen 1 and the backlight module 3. The first member 5 is arranged between the bottom part of the front frame and the backlight module 3, to adjust a gap between the front frame and the display screen 1.

Figure 5:
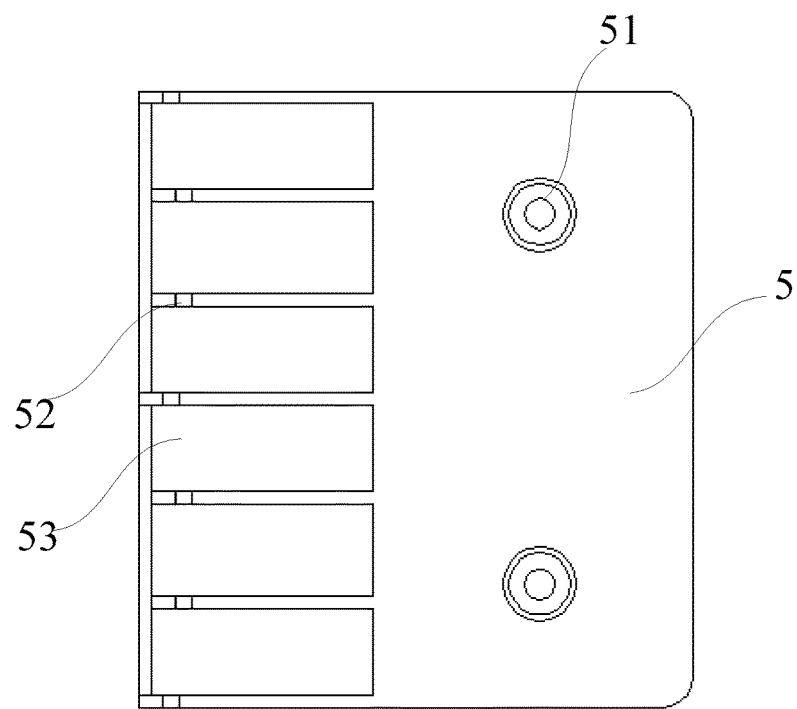
FIG. 5 is a schematic view of a first member according to one embodiment of the present application.
Figure 6:
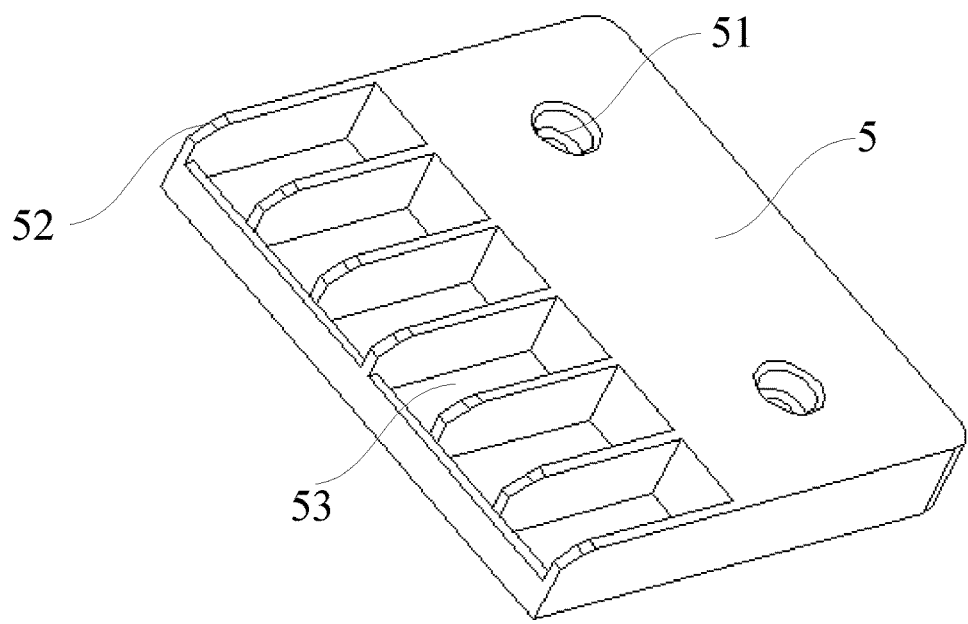
FIG. 6 is another schematic view of the first member according to one embodiment of the present application.

FIGS. 5-6 are schematic views of the first member 5. The first member 5 is of a cube shape, and includes screw holes 51 defined therein for installation. The first member 5 includes a plurality of curved mounting guide corner members 52 formed at a side thereof closer to the side wall of the front frame. When assembling the front frame, the first member 5 serves as a guide and to adjust a gap between front surfaces. Furthermore, the first member 5 may be formed through injection molding, and thus there is a certain requirement for the thickness of the first member 5. Then, a plurality of grooves 53 is evenly defined in the first member 5.

Upon assembling, the first member 51 is first mounted on a back side of the backlight module 3 (i.e. one side of the backlight module 3 that is away from the display screen) in a manner such as screw fastening, clamping, etc. Then, the display screen 1 is mounted on the backlight module 3 in such a manner that the display screen 1 is placed within a retaining wall region of the backlight module 3 in a flatwise orientation. Before assembling the front frame, the front frame connectors 4 are mounted on the front frame bars 2 and 8, respectively. FIG. 4 is a schematic view showing the front frame connector 4 mounted on a top side of the front frame bar 8. The first mounting plate 41 of the front frame connector 4 is connected to the front frame bar 8 in a manner such as adhering, screw fastening, etc. Then, the front frame bars 2 and 8 are mounted on the backlight module 3 on which the display screen 1 has been mounted. In this process, each of the front frame bars 2 and 8 has a U-shaped structure in a cross section thereof, and the backlight module 3 and the display screen 1 are clamped into the U shaped structure of each of the front frame bars 2 and 8, i.e., edges of the backlight module 3 and the display screen 1 are packaged by the front frame bars 2 and 8. Meanwhile, the first member 5 is also clamped into the front frame bars 2, 8, and then fastened by screws from a back side (i.e. a side of the first member 5 that is away from the display screen). The curved mounting guide corner members 52, which are formed at a side of the first member 5 closer to the side wall of the front frame, each serves as a guide and to adjust a gap between front surfaces when assembling the front frame. Then, the front frame bars 7 and 9 are assembled. Each of the front frame bars 7 and 9 has a U-shaped structure in a cross section thereof and includes screw holes defined therein. The assembled front frame bars 7 and 9 are fixed by fastening screws from lateral sides. Meanwhile, the front frame bars 7 and 9 are fastened to the second mounting plates 42 of the front frame connectors 4 by fastening screws at four corners, so that the front frame bars 2, 7, 8 and 9 are connected as a whole. Then, the back cover 6 is covered in such a manner that the back cover 6 is fastened to the backlight module 3 by screws from a side of the back cover 6 away from the display screen 1.

In this embodiment, the front frame directly serves as a module outer frame and is mounted to the back cover 6 through screws. In order to ensure strength of the display module in which the metal outer frame 10 is omitted, the front frame is formed by jointing the front frame bars with the front frame connector 4 at each junction, so as to decrease deformation of the front frame. Optionally, the first member 5 is arranged at the back side of the backlight module (i.e., a side of the backlight module that is away from the display screen) to control the deformation of the front frame. In addition, there might be a gap between the front frame and the display screen when adopting the back-side fastening arrangement, and then the first member 5 serves as a support to control the gap between the front frame and the display screen. Optionally, the front frame includes a first opposite bar group and a second opposite bar group, each of which includes front frame bars that are oppositely arranged. The first member 5 is installed between the backlight module and a bottom part of one of the front frame bars in the first opposite bar group. The first opposite frame group is installed in a back-side fastening mode.

Optionally, the first opposite bar group includes two short front frame bars of the front frame, and the second opposite bar group includes two long front frame bars. The two long front frame bars are installed in a lateral-side fastening mode. It should be noted that, in this embodiment, the front frame bars 2 and 8 correspond to short sides of the display device (i.e., the front frame bars 2 and 8 are two short front frame bars, which belong to the first opposite bar group). The front frame bars 2 and 8 are installed in the back-side fastening mode, i.e., the front frame bars 2 and 8 are fastened to the backlight module 3 and the display screen 1 by installing the screws from the back side of the front frame bars 2 and 8 (i.e., a side away from the display screen). The front frame bars 7 and 9 correspond to the long sides of the display device (i.e., the front frame bars 7 and 9 are two long front frame bars, which belong to the second opposite bar group). The front frame bars 7 and 9 are installed in the lateral-side fastening mode, i.e., the front frame bars 7 and 9 are fastened to the backlight module 3 and the display screen 1 by installing screws from the lateral sides.

In the embodiment, the front frame of the display device also functions as the metal outer frame of the display module, and thus it is better to avoid installing the screws from the front side or the lateral side in consideration of an artistic appearance of the product. However, when the front frame is fastened and fixed by installing screws from the back side, there might be a considerable gap between the front frame and the display screen, and thus problems such as light leaking or screen broken may arise. Furthermore, the front side of the front frame is prone to warp and deform, so the artistic appearance of the display device is deteriorated. For solving the above problem, in the embodiment, the following technical means are adopted: first, the frame is formed by jointing front frame bars as a whole with the front frame connectors 4 at each junction; second, flatness and the gap between the front frame and the display screen are adjusted by the first member 5, so as to facilitate assembling; the presence of the curved guide corner members 52 further facilitates assembling. The gap may be adjusted by the height of the member 5.

Optionally, the four front frame bars 2, 7, 8 and 9 may be fixed via the first member 5 in the back-side fastening mode.

Optionally, in order to reduce the number of the first members 5 and try to avoid adopting the lateral-side fastening mode at the short sides in consideration of artistic appearance of the display device, in one embodiment, the first members 5 are merely mounted between the bottom parts of the front frame bars 2 and 8 (i.e. the two short front frame bars) and the backlight module 3, and then the front frame bars 2 and 8 are installed in the back-side fastening mode. Furthermore, the front frame bars 7 and 9 (i.e. the two long front frame bars) are installed in the lateral-side fastening mode, which facilitates controlling the gap between the top of the front frame bar and the display screen 1, and thus the first member 5 may not be installed in correspondence with each of the front frames 7 and 9.

In addition, as shown in FIGS. 2 and 4, the front frame connector 4 is mounted at the corner of the frame, and the first plate 41 and the second plate 42 of the front frame connector 4 are vertical to each other, so that the front frame bars 7 and 8 are connected by the front frame connector 4 with an angle of 90 degrees defined between the front frame bars 7 and 8. As a matter of fact, two front frame bars may be connected by the front frame connector 4 with an angle of 180 degrees defined between the two front frame bars, i.e., two front frame bars are connected by the front frame connector 4 to form an extended front frame bar, which is particularly applicable to the large-sized display device. In this situation, an angle defined between the first and the second plates of the front frame connector 4 is 180 degrees.

Furthermore, it is high expense for making a front frame mould for manufacturing ultra-large sized display devices (for example, the ultra large sized LCD-TV), even if such expense is shared with each ultra-large sized display device being produced. In contrast, in this embodiment, since the front frame is formed by connecting the frame bars with the front frame connectors, thus it is merely required to make moulds for making the frame bars and the front frame connectors, and thus the cost for making the moulds is reduced. In addition, such frame bars are versatile and easy to form frames of various sizes, so that the ultra-large sized display device may share same moulds with the small sized display device. As a result, the cost for making moulds is shared with more products, and thus the cost for developing the product is decreased.

Optionally, the first member 5 may be a plastic component or metal component. Similarly, the front frame connector 4 may be a plastic component or a metal component.

In summary, according to the embodiments of the present disclosure, the metal outer frame 10 is omitted in the display module and the display device incorporating with display module, and thus the cost for producing and developing the product is decreased. In addition, the thickness of the display device is reduced by a thickness of the outer frame, and then the display device is lighter and thinner, and such arrangement is particularly applicable to the large sized or ultra-large sized display device such as the ultra-large sized TV.

In this embodiment, the display device may be a liquid crystal display device or an organic light-emitting diode (OLED) display device, an electronic paper, a mobile phone, a tablet computer, a television, a monitor, a notebook computer, a digital picture frame, a navigation system or any other product or component having a display function.

In the present disclosure, the display screen is not particularly limited, which may be any display screen that is known for a person skilled in the art. In addition to the common LCD screen or OLED screen, the display screen may be an electroluminescent screen, a plasma screen, etc.

It is noted that, the technical features in the present disclosure may be combined in any manner as long as it is possible.

In the present disclosure, the embodiments are described in a progressive manner, similar or same portions among respective embodiments are not repeated for clarity, and the focus of each embodiment is different. In particular, for the device embodiment which is briefly described, it may refer to the corresponding method embodiment.

The above are merely embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure. Thus, a scope of the present disclosure is confined in claims.

What is claimed is:

1. A display module applied to a display device, comprising a backlight module and a display screen arranged in front of the backlight module;
    wherein the display module further comprises a front frame that is shared with the display device, and the backlight module and the display screen in the display module are directly fixed together by the front frame; and the front frame forms a front outer surface of the display device,
    wherein the backlight module further comprises a back cover that is shared with a back border of the display device, the back cover forms a back outer surface of the display device, and the display screen and components in the backlight module are directly fixed by the front frame and the back cover,
    wherein the front frame comprises a plurality of front frame bars and a plurality of front frame connectors, the front frame is formed by jointing the front frame bars through the front frame connectors, and two adjacent of the front frame bars are jointed through one of the front frame connectors,
    wherein each of the front frame connectors comprises a first mounting plate and a second mounting plate connected to the first mounting plate, the first mounting plate and the second mounting plate are connected to two adjacent of the front frame bars, respectively, and the two adjacent front frame bars completely cover the first mounting plate and the second mounting plate, respectively.

2. The display module according to claim 1, wherein the front frame comprises a top part, a bottom part and a side wall connecting the top part and the bottom part; the display module further comprises at least one first member which is arranged between the backlight module and the bottom part of the front frame; the first member is configured to adjust a gap between the front frame and the display screen.

3. The display module according to claim 2, wherein the first member is arranged on a side of the backlight module that is away from the display screen.

4. The display module according to claim 3, wherein the first member is mounted on the side of the backlight module that is away from the display screen by screw fastening or clamping.

5. The display module according to claim 2, wherein the first member comprises a curved mounting guide corner member formed at a side of the first member that is closer to the side wall.

6. The display module according to claim 5, wherein the first member is a plastic component or metal component.

7. The display module according to claim 2, wherein the first member is formed through injection molding, the first member is of a cube shape, and a plurality of grooves is evenly defined in the first member.

8. The display module according to claim 1, wherein the front frame comprises a first opposite bar group and a second opposite bar group; each of the first opposite bar group and the second opposite bar group comprises front frame bars that are oppositely arranged;
    the first member is installed between the backlight module and the bottom part of one of the front frame bars in the first opposite bar group, and the first opposite bar group is installed in a back-side fastening mode.

9. The display module according to claim 8, wherein the front frame bars in the first opposite bar group are two short front frame bars of the front frame; and the front frame bars in the second opposite bar group are two long front frame bars; and the two long front frame bars are installed in a back-side fastening mode.

10. The display module according to claim 1, wherein each of the front frame bars has a U-shaped cross section.

11. The display module according to claim 1, wherein a back cover is fastened to the front frame bars from a side of the back cover that is away from the display screen.

12. The display module according to claim 1, wherein the display screen is placed within a retaining wall region of the backlight module in a flatwise orientation.

13. The display module according to claim 1, wherein an angle defined between the first plate and the second plate of each of the front frame connectors is 90 degree or 180 degree, and
    when one of the front frame connectors is in one of four corners of the front frame, the angle defined between the first plate and the second plate of the one front frame connector is 90 degree.

14. The display module according to claim 1, wherein the front frame connectors is a plastic component, or a metal component.

15. A display device comprising a display module, wherein the display module comprises a backlight module and a display screen arranged in front of the backlight module, and a front frame that is shared with the display device,
    the backlight module and the display screen in the display module are directly fixed together by the front frame, and the front frame forms a front outer surface of the display device,
    wherein the backlight module further comprises a back cover that is shared with a back border of the display device, the back cover forms a back outer surface of the display device, and the display screen and components in the backlight module are directly fixed by the front frame and the back cover, wherein the front frame comprises a plurality of front frame bars and a plurality of front frame connectors, the front frame is formed by jointing the front frame bars by using the front frame connectors, and two adjacent of the front frame bars are jointed through one of the front frame connectors, wherein each of the front frame connectors comprises a first mounting plate and a second mounting plate connected to the first mounting plate, the first mounting plate and the second mounting plate are connected to two adjacent of the front frame bars, respectively, and the two adjacent front frame bars completely cover the first mounting plate and the second mounting plate, respectively.

16. A display device, comprising:

a front frame, comprising a top part, a bottom part and a side wall connecting the top part and the bottom part; and a backlight module, a display screen and at least one first member which are fixed between the bottom part and the top part;

wherein the display screen is installed in front of the backlight module and directly connected to the top part; the first member is installed at a back side of the backlight module and located between the back side of the backlight module and the bottom part, and the backlight module and the display screen are directly fixed together by the front frame, wherein the backlight module further comprises a back cover that is shared with a back border of the display device, the back cover forms a back outer surface of the display device, and the display screen and components in the backlight module are directly fixed by the front frame and the back cover, wherein the front frame comprises a plurality of front frame bars and a plurality of front frame connectors, the front frame is formed by jointing the front frame bars by using the front frame connectors, and two adjacent of the front frame bars are jointed through one of the front frame connectors, wherein each of the front frame connectors comprises a first mounting plate and a second mounting plate connected to the first mounting plate, the first mounting plate and the second mounting plate are connected to two adjacent of the front frame bars, respectively, and the two adjacent front frame bars completely cover the first mounting plate and the second mounting plate, respectively.

17. The display device according to claim 16, wherein the first member is mounted at the back side of the backlight module by screw fastening or clamping.

18. The display device according to claim 16, wherein the first member comprises a curved mounting guide corner member formed at a side of the first member that is closer to the side wall.

19. The display device according to claim 16, wherein the side wall directly faces an entire lateral side of the backlight module.

20. The display device according to claim 16, wherein a portion of the bottom part that is in contact with the first member is mounted on the first member by a screw.

* * * * *